Oct. 24, 1961      W. E. BLAIN      3,005,521
RUDDER BRAKE
Filed July 23, 1958
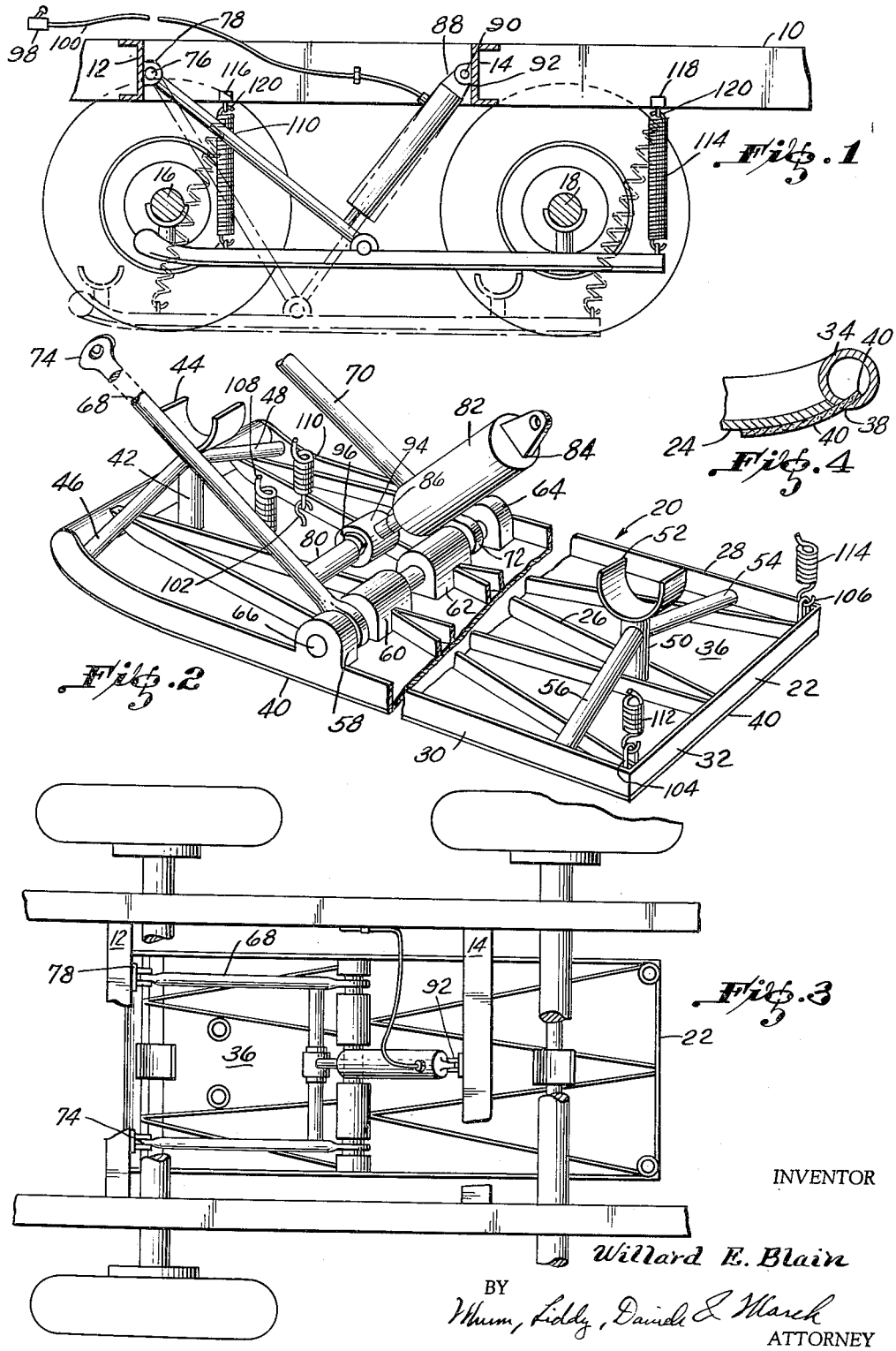
INVENTOR
Willard E. Blain
BY
ATTORNEY

United States Patent Office 3,005,521
Patented Oct. 24, 1961

3,005,521
RUDDER BRAKE
Willard Edwin Blain, % Blain Mfg. Co., P.O. Box 175, Miami, Okla.
Filed July 23, 1958, Ser. No. 750,472
1 Claim. (Cl. 188—5)

This invention relates to improvements in brakes for vehicles of a dirigible type and in particular to a rudder brake construction. This invention also relates to braking and stabilizing means for vehicles of the wheeled type and particularly to trucks, automobiles, and similar vehicles which are normally found transversing our highways.

The known tendency of brake systems to fail from time to time at inopportune moments as well as the underside effects of skidding or side slipping in vehicles is a constant danger on the highways and many serious accidents are caused by brake failures, sliding and side slipping of vehicles. This is particularly true large heavy vehicles such as trailers and large trucks. It is unfortunately a common experience to read of serious damage caused by a runaway truck or a trailer.

Furthermore it is common to learn of the type of mishap referred to as "jackknifing" which most particularly occurs with trailers and other large vehicles although its counterpart occurs in even small passenger cars. This is the type of accident in which the rear wheeled portions of the vehicle tend to overtake the front wheels by a combined sidewise and forward motion of the rear wheels with respect to the frontwheels. One of the objects of my invention is to provide a brake means adaptable for vehicles particularly for trailers which would serve as the means for stopping the vehicle and also a brake type means which will serve to prevent jackknifing.

Yet a further object of the invention is to provide a brake means which serves as a stabilizing device for stabilizing vehicles during the operation thereof and particularly during the braking thereof.

Another object of the invention is to provide a braking device for preventing jackknifing of vehicles which is adaptable particularly for trailers and which is operable independent of the braking system of the vehicle.

A further object of the invention is to provide a better braking device for trailers having a means preventing jackknifing which is of simple construction and can be readily adapted for use in trailers and similar vehicles.

A still further object of the invention is to provide brake apparatus adapted to frictionally engage a roadway surface which is easily mounted on trailers or similar vehicles.

A further object of the invention is to provide a rudder brake device which is readily operable to engage or retract from a roadway surface.

Yet a further object of my invention is the provision of such brake means which does not encumber the vehicle, which does not interfere with its operation and which is otherwise entirely acceptable for adaptation to known vehicles and trailers.

These and other objects and advantages will become apparent from the following description and the accompanying drawings wherein:

FIGURE 1 is a fragmentary sectional elevational view of a brake constructed in accordance with the invention mounted on a trailer.

FIGURE 2 is a perspective view of the brake of FIGURE 1.

FIGURE 3 is a top view of the trailer and brake illustrated in FIGURE 1 with some elements being broken away to improve the showing.

FIGURE 4 is a fragmentary sectional view showing a portion of the brake structure.

As heretofore pointed out the tendency of trailers to jackknife has caused many serious accidents and much thought has been given and many attempts have been made to solve this problem. However, so far as known to me no one has previously devised a method or apparatus which will satisfactorily prevent a truck or trailer jackknifing. Through my invention however this curse of the highways can be eliminated. Many lives can be saved and much property preserved, yet the means of accomplishing this result is relatively simple, and comparatively inexpensive as compared to any other elements of a truck or trailer manufacturer. A further accomplishment of my invention is the provision of a brake means accomplishing the desired results which is continuously and entirely reliable and will operate when needed.

Referring now in particular to the drawings, where for purposes of the instant disclosure the brake structure is shown as embodied in at railer having paired axles: There is there illustrated a trailer frame 10 having cross members 12 and 14 and paired axles 16 and 18. It is understood that these axles are connected to the frame 10 by suspension devices such as springs; further, that the axle supporting wheels have braking mechanisms operated by the usual brake structure employed on trailers. A stabilizing and braking device 20 constructed in accordance with the invention is seen to be suspended from the frame 10. This braking device comprises a casting 22 haivng a flat lower surface 24. On its upper side the casting has rib structure 26 for stiffening purposes, and side walls 28 and 30, and rear wall 32 are provided along the edges of the casting. At its front end the casting is connected to a tubular member 34. The tubular member is welded to the casting 22 or can be formed as an integral part thereof. Preferably the base 36 is formed of aluminum. The other elements which are integral therewith and are cast at the same time are likewise formed of aluminum.

The tubular member 34 has a slot 38. This slot is adapted to accept the forward end of a friction material such as brake band material 40. This material extends rearwardly along the lower surface and is preferably secured thereto by adhesive. The material can be any well known brake band material and the bonding process is well known. The reception of the front edge of the material in tube 34 prevents tearing and snagging of the latter edge.

Near the forward end of the brake a tubular post 42 extends vertically upwardly longitudinally centrally of the base 36. An axle rest in the form of a half sleeve 44 is secured to the upper end of post 42. This rest faces upwardly and is of a shape conformable with the circumference of the axle 16. The rest is adapted to receive the latter as illustrated in FIGURE 1. The post 42 is braced by side braces 46 and 48.

A similar post 50, rest 52 and braces 54, 56 are supported longitudinally central of the base and adjacent the rear of the device. These are adapted to cooperate with the rear axle 18. The posts 42 and 50 are spaced in conformity with the truck structure. Spaced paired bosses comprising the boss members 58, 60, 62 and 64 extend upwardly from the base forwardly of the transverse center of the latter. These bosses extend transversely of the longitudinal axis of the base. An axle 66 is received within these bosses. A pair of connecting rods 68 and 70 have enlarged ends 72 which pivotally receive the axle 66. These connecting rods extend upwardly and forwardly of the bosses and at their upper ends are provided with enlarged portions 74 pierced to pivotally receive shaft 76. Shaft 76 is supported in spaced bifurcated bearing support means 78. The latter are attached to the cross member 12. The connecting rods 68 and 70 support an intermediate axle member 80 intermediate their ends. The latter is secured to the rods 68 and 70 preferably by welding. An operating motor, preferably an air motor of the piston cylinder type, is connected to the axle 80. As illustrated in the drawing the air motor 82 can comprise a cylinder 84 and a piston rod 86.

The cylinder has an integral flange 88 at one end. The latter is pivotally supoprted on a shaft 90. The shaft in turn is supported by bifurcated flange 92 which is attached to the frame member 14 of the tractor. The piston rod has an enlarged end 94 connected thereto. This is preferably formed as a separate element and is threadingly connected to the rod. The shaft 80 has a central portion adapted to cooperate with the enlarged portion 94 and has stops 96 which maintain the end 92 in proper position on the axle 80. The stops comprise curved plates attached to shaft 80 by screws. These bear against the sides of the end 94 and maintain the latter in proper position. The operating rod 86 can be threadingly engaged with the end 94 once the later end is connected to shaft 80 and shaft 80 is connected to operating rods 68 and 70. A control device 98 and air lines 100 are provided for controlling the operation of the motor 82. A pair of spring connecting hooks 102 are mounted adjacent the front of the base 36 and a pair of loops 104 and 106 are mounted adjacent the rear side edges. These provide means for attaching retracting springs 108, 110, 112 and 114 to the base 36. Four spaced spring support bases 116 and 118 are connected to the trailer frame. Loops 120 are provided on the latter for connection to the springs. These springs normally maintain the rudder brake in its upper inoperative position wherein the sleves 42, 52 receive the shafts 16 and 18. This stabilizes the brake on the vehicle. When it is desired to operate the brake, air is admitted to the motor 82 and the brake is thrust downwardly and forwardly. The movement is such that there is a wedging like action of the motor. When the lower surface of the brake contacts the roadway the vehicle will be slowed. Further when the brake contacts the roadway adjacent the rear of the trailer it will function as a rudder in that it will maintain the trailer on a straight path due to the considerably increased drag at the rear. To further increase the rudder effect the brake is constructed so as to have a length from four to five times greater than its width and thus it constitutes a relatively long narrow braking means. In an embodiment of the device as actually employed in vehicles the length is 84 inches and the width is 18 inches. However, it is understood there is no intent to restrict the invention to such a structure. The stabilizing and braking effect achieved with rudder brakes constructed in accordance with the invention has been fully demonstrated. Vehicles employing my device will not jackknife. If they tend to jackknife they immediately straighten out when the rudder brake is applied.

While I have shown and described the preferred form of my invention it will be understood by those skilled in the art that many changes in form and details of construction can be made within the scope of the appended claim, and I claim an exclusive right to all changes, modifications, and forms coming within the scope of the appended claim.

I claim:

A combined rudder and brake for a vehicle having a frame with spaced axles connected thereto comprising a member having a substantially flat bottom surface, bearing means connected to said member above said bottom surface, rods pivotally connected at their respective ends to said bearing means and said frame, an expansible and retractable air motor pivotally connected to said rods and frame and adapted to extend at an angle rearwardly and upwardly toward said frame with respect to said member, a pair of vertically extending rests mounted on said member adjacent each end thereof, said rests engageable with said axles to stabilize said member with respect to said frame, spring means connected to said member and said frame for normally urging said rests upwardly into engagement with said axles, said motor being operable to move said rests out of engagement with said axles contemporaneous with moving said member into contact with the road surface beneath the vehicle.

References Cited in the file of this patent

UNITED STATES PATENTS

| | | |
|---|---|---|
| 977,631 | Hopper | Dec. 6, 1910 |
| 1,132,206 | Miller | Mar. 16, 1915 |
| 1,625,226 | Simmons | Apr. 19, 1927 |
| 2,710,074 | Simpson | June 7, 1955 |
| 2,775,314 | Hiemstra | Dec. 25, 1956 |
| 2,871,986 | Polovitch | Feb. 3, 1959 |

FOREIGN PATENTS

| | | |
|---|---|---|
| 664,758 | France | Apr. 29, 1929 |
| 302,728 | Italy | Nov. 7, 1932 |
| 104,898 | Switzerland | Aug. 30, 1923 |